(12) United States Patent
Marcet et al.

(10) Patent No.: US 12,304,737 B2
(45) Date of Patent: May 20, 2025

(54) AUTOMATED FLOW CONTROL FOR RUBBER PRODUCT MANUFACTURING PROCESSES

(71) Applicant: COMPAGNIE GENERALE DES ETABLISSEMENTS MICHELIN, Clermont-Ferrand (FR)

(72) Inventors: Gregory Marcet, Clermont-Ferrand (FR); Gwenael Favro, Clermont-Ferrand (FR); Olivier Combe, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 862 days.

(21) Appl. No.: 17/461,650

(22) Filed: Aug. 30, 2021

(65) Prior Publication Data

US 2022/0055837 A1     Feb. 24, 2022

(30) Foreign Application Priority Data

May 6, 2021   (FR) ..................... 2104772

(51) Int. Cl.
*B65G 1/137*     (2006.01)
*B25J 9/00*      (2006.01)
(Continued)

(52) U.S. Cl.
CPC .......... *B65G 1/1378* (2013.01); *B65B 65/003* (2013.01); *B65G 1/0485* (2013.01);
(Continued)

(58) Field of Classification Search
CPC .. B65G 1/1378; B65G 65/003; B65G 1/0485; B65G 47/90; B65G 63/002;
(Continued)

(56) References Cited

U.S. PATENT DOCUMENTS 5,281,081 A * 1/1994 Kato .................... B65G 1/1378
                                                    414/789.6
6,682,292 B2   1/2004 Estes
(Continued)

FOREIGN PATENT DOCUMENTS

CN     205837747 U    12/2016
CN     106742061 A     5/2017
(Continued)

*Primary Examiner* — Timothy R Waggoner
(74) *Attorney, Agent, or Firm* — VENABLE LLP

(57) ABSTRACT

A supply installation (22) for a site (10) for producing rubber products from rubber blocks of rubber mixtures of predetermined weight and volume includes: an input station where the supply installation performs a process of entry of empty bins ($B_V$) for receiving, during a picking process, rubber blocks identified to satisfy a rubber product production campaign; a discharge station where the supply installation performs a process of discharging full bins ($B_P$) containing the picked rubber blocks; a supply means that manages the transport of the empty bins and the full bins to the supply installation; and a picking station that performs a process of picking the rubber blocks grouped in a container according to the status of the current rubber product production campaign.

11 Claims, 5 Drawing Sheets

(51) Int. Cl.
  *B25J 15/00*   (2006.01)
  *B65B 65/00*   (2006.01)
  *B65G 1/04*    (2006.01)
  *B65G 47/90*   (2006.01)
  *B65G 63/00*   (2006.01)

(52) U.S. Cl.
  CPC .......... *B65G 47/90* (2013.01); *B65G 63/002* (2013.01); *B25J 9/0093* (2013.01); *B25J 15/0071* (2013.01); *B65G 2203/0258* (2013.01)

(58) Field of Classification Search
  CPC ........... B65G 2203/0258; B65G 1/1376; B25J 9/0093; B25J 15/0071; B25J 15/0019; B29D 30/005; B29D 30/0016
  See application file for complete search history.

(56) References Cited

U.S. PATENT DOCUMENTS

| | | | |
|---|---|---|---|
| 8,172,498 | B2 | 5/2012 | Enenkel |
| 9,394,145 | B2 | 7/2016 | Yada et al. |
| 10,766,701 | B2 | 9/2020 | Manley |
| 11,905,116 | B2 | 2/2024 | Arase et al. |
| 2002/0070640 | A1 | 6/2002 | Hamilton et al. |
| 2012/0031808 | A1 | 2/2012 | Cavallini |
| 2014/0244026 | A1* | 8/2014 | Neiser ............... B65G 1/1378 700/216 |
| 2015/0274491 | A1* | 10/2015 | Yada ................ B66C 1/58 414/591 |
| 2015/0290805 | A1* | 10/2015 | Morency ............ B25J 9/1679 700/99 |
| 2017/0348854 | A1* | 12/2017 | Oleynik ............ A47J 47/02 |
| 2018/0050451 | A1 | 2/2018 | Takanishi et al. |
| 2020/0254651 | A1* | 8/2020 | Tournebize ........ B29B 15/023 |
| 2020/0283241 | A1 | 9/2020 | Quaglia et al. |
| 2021/0233018 | A1 | 7/2021 | Astier |
| 2021/0387359 | A1 | 12/2021 | Marcet et al. |
| 2021/0387817 | A1 | 12/2021 | Favro et al. |

FOREIGN PATENT DOCUMENTS

| | | |
|---|---|---|
| CN | 206840077 U | 1/2018 |
| CN | 108527322 A | 9/2018 |
| CN | 208021776 U | 10/2018 |
| CN | 110713019 A | 1/2020 |
| CN | 210417931 U | 4/2020 |
| CN | 112407741 A | 2/2021 |
| DE | 102019207401 A1 | 11/2020 |
| EP | 1829804 A2 | 9/2007 |
| EP | 3442764 A1 | 2/2019 |
| FR | 2971237 A | 8/2012 |
| JP | 10-297768 A | 11/1998 |
| JP | 2005-297091 A | 10/2005 |
| JP | 2006-240837 A | 9/2006 |
| JP | 2009-172720 A | 8/2009 |
| JP | 2018-27581 A | 2/2018 |
| WO | 2010/057898 A1 | 5/2010 |
| WO | 2019/193272 A1 | 10/2019 |
| WO | 2020/025868 A1 | 2/2020 |

\* cited by examiner

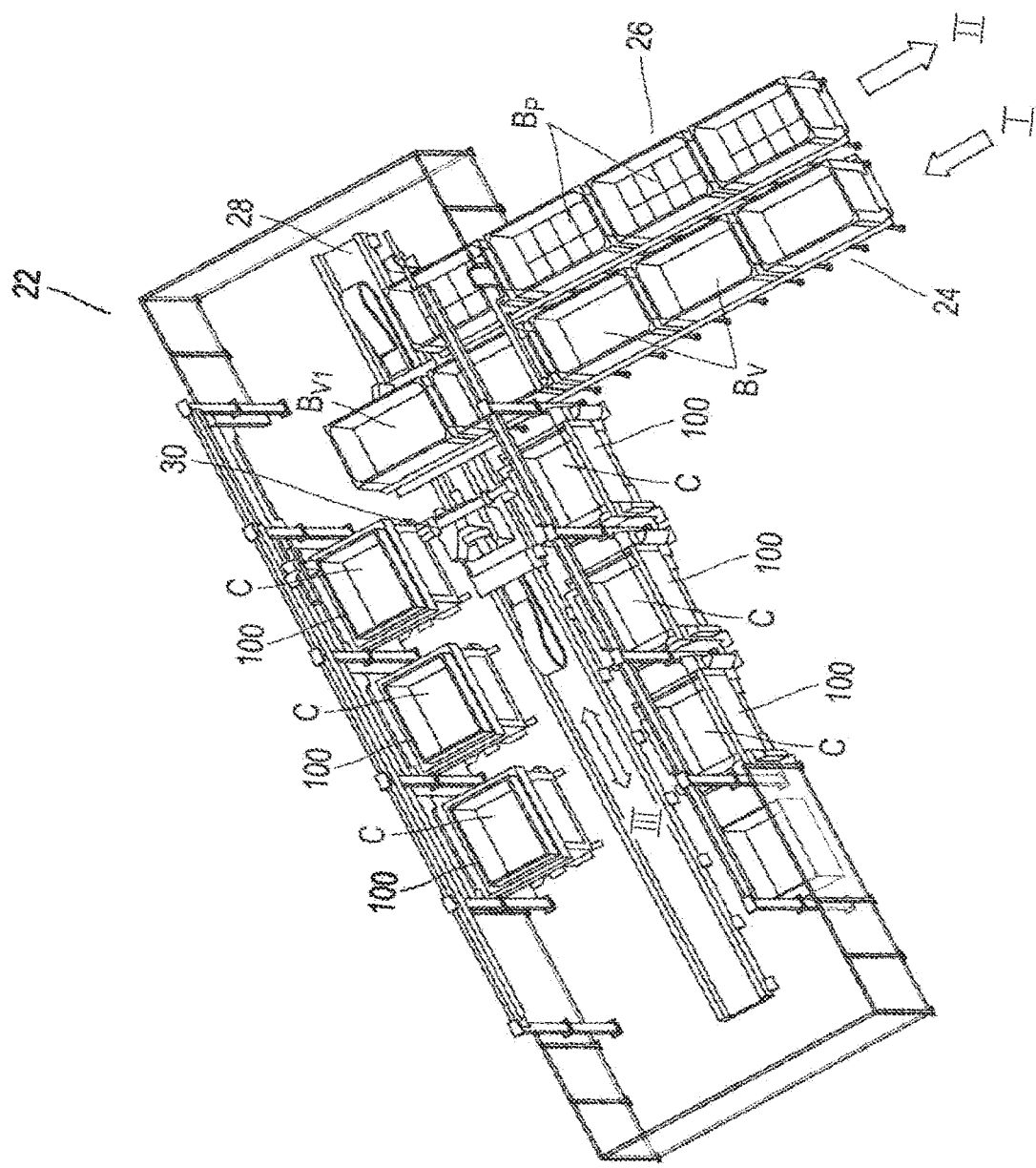

[Fig 3]
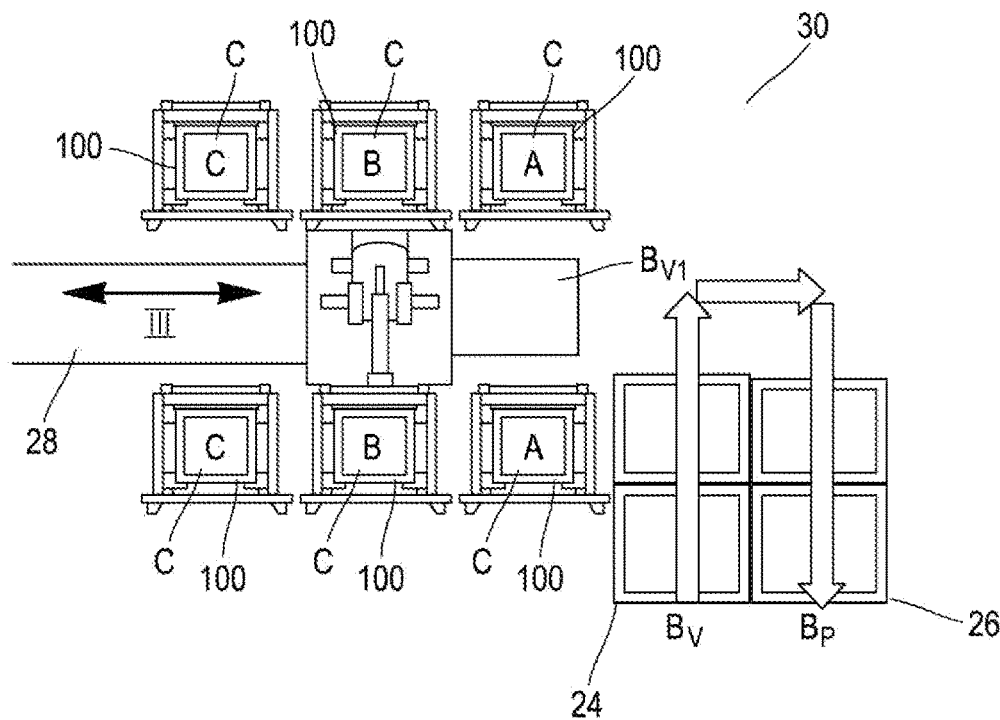
[Fig 4]
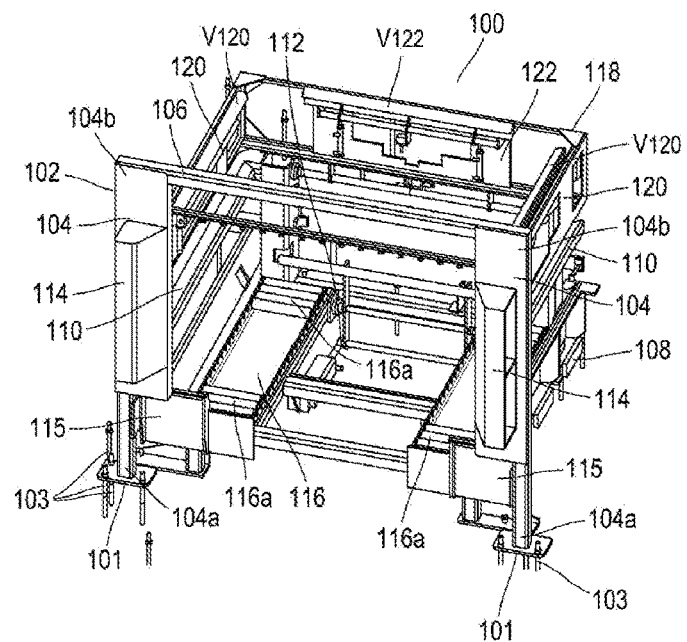

[Fig 5]
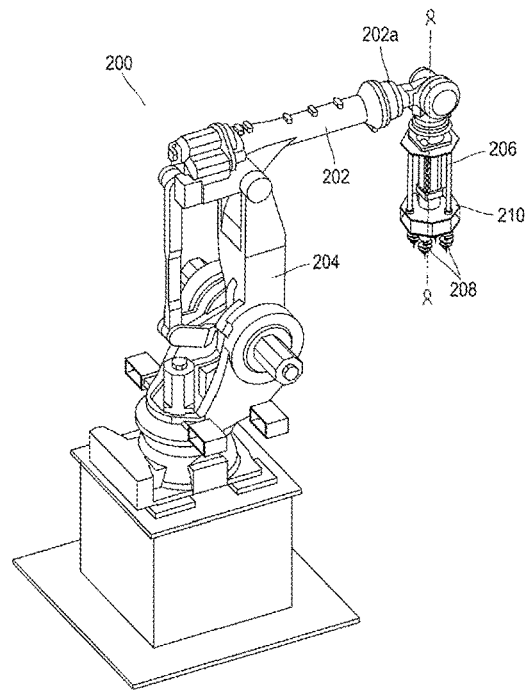
[Fig 6]
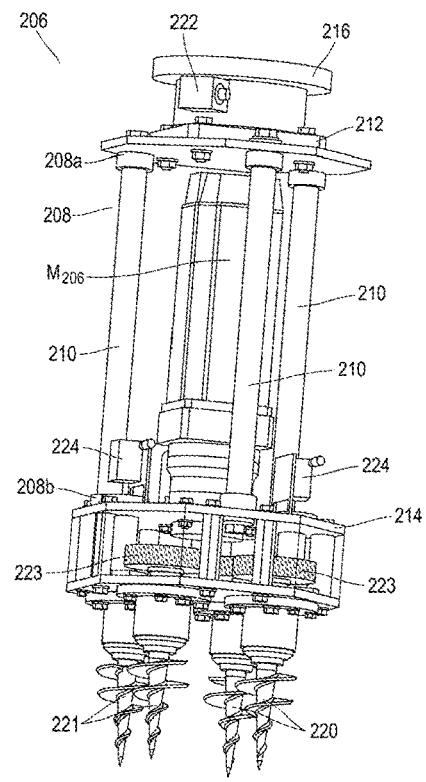

[Fig 7]
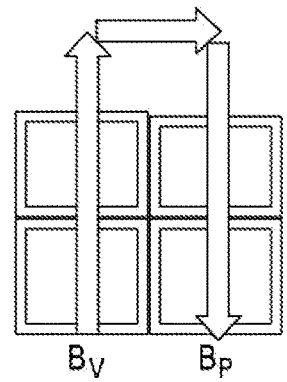
[Fig 8]
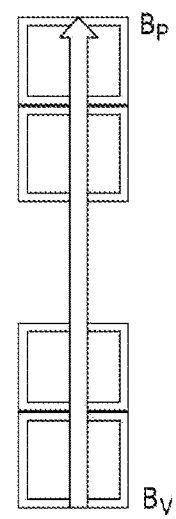
[Fig 9]
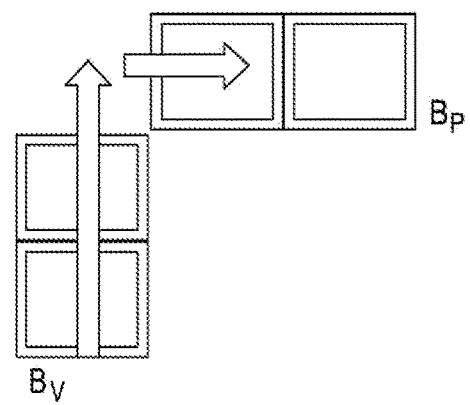

AUTOMATED FLOW CONTROL FOR RUBBER PRODUCT MANUFACTURING PROCESSES

TECHNICAL FIELD

The invention relates generally to the production of rubber mixtures and rubber products prepared therefrom. More particularly, the invention relates to the control of automated flows of rubber blocks made up of rubber mixtures in a rubber product production site.

BACKGROUND

In the field of rubber product manufacturing (including tires), a succession of installations is used for the processing of rubber mixtures. The installations are part of a rubber product manufacturing process, with each installation dedicated to one or more process steps. At each facility, the steps are performed by a machine or machines dedicated to different processes, including extrusion processes, mixing processes, assembly processes and dehulling processes.

In order to make up the rubber products produced by these machines, rubber mixtures are selected from a variety of rubber mixtures that are blended in different quantities and from a variety of recipes. Each rubber mixture incorporates different materials necessary to make the rubber product, including, without limitation, elastomer(s) (e.g., natural rubber, synthetic elastomer, and combinations and equivalents thereof), reinforcing fillers (such as carbon black and silica), liquid plasticizers (e.g., known oils and resins), additives (e.g., 6PPD), and vulcanizing agents. In order to attain the most homogeneous properties possible, a batch of rubber to be mixed may include different kinds and grades of elastomer, each kind typically being provided in the form of blocks (or "bales") of gum (or "rubber") of predetermined weight and volume (as used herein, it is understood that the terms "gum" and "rubber" are interchangeable).

In addition, in current production facilities, there are arrangements of rubber blocks that are grouped according to their common properties, which facilitates their handling and ensures their optimal storage in the available storage space. For example, the rubber blocks can be stacked in crates, bins or other equivalent containers, on pallets or on transport means (being transported, for example, on belts or by shuttles). The handling and storage of rubber blocks is therefore an important part of the rubber product manufacturing process.

The control of the flow of the rubber blocks must also be precisely monitored to ensure an optimized production process. In a rubber product production facility, it is known that there is a wide variety of types of rubber mixtures available to fulfill the recipes required to produce the rubber products. According to a selected recipe, the right mass quantity of these rubber mixtures must be supplied to the right machine at the right time.

Thus, the invention relates to the control of automated flows of rubber blocks made up of rubber mixtures in a rubber product production site. This control involves a new modularity of control tools, such as robots, containers and autonomous vehicles to optimize the available stock of rubber mixtures.

SUMMARY OF THE INVENTION

The invention is directed to a supply installation for a site for producing rubber products from rubber blocks of rubber mixtures of predetermined weight and volume, characterized in that the supply installation includes:
  an input station where the supply installation performs a process of entry of empty bins for receiving, during a picking process, rubber blocks identified to satisfy a rubber product production campaign;
  a discharge station where the supply installation performs a process of discharging full bins containing the picked rubber blocks;
  a supply means that manages the transport of the empty bins and the full bins to the supply installation; and
  a picking station that performs a process of picking the rubber blocks grouped in a container according to the status of the current rubber product production campaign.

In some embodiments of the supply installation of the invention, the picking station includes:
  at least one automated cell with at least one container assigned to each cell; and
  at least one robot that performs a process of picking the rubber blocks grouped in the container, with the robot operatively disposed relative to the cells and relative to the supply means.

In some embodiments of the supply means of the invention, the cell includes:
  a frame that allows attachment of the cell;
  an automatic centering system having guiding means that allow precise positioning of a container disposed in a loading space of the cell;
  a clamping system having holding means that maintain the positioning of the disposed container in the loading space of the cell; and
  a locking system having locking means that maintain the positioning of the container disposed in the loading space of the cell.

In some embodiments of the supply installation of the invention:
  the guiding means of the cell includes a pair of guides aligned at the cell entrance;
  the holding means of the cell includes a tiltable holding frame with a pivoting chassis mounted on the frame such that the chassis moves between a standby position, where the chassis remains tilted to allow loading and positioning of the container in a loading space of the cell, and a clamping position, where the chassis descends; and
  the locking means of the cell includes a barrier mounted on the frame such that the barrier moves between an unlocked position, where the barrier remains tilted to allow loading and positioning of the container in the loading space, and a locked position, where the barrier moves up to block and abut the container in a known plane.

In some embodiments of the supply installation of the invention, the chassis of the cell includes at least one of the following:
  a fastening means for moving the chassis between the standby position and the clamping position;
  a clamping element to form the tiltable holding frame; and
  one or more flaps, each flap being pivotally movable up and down.

In some embodiments of the supply installation of the invention, the robot includes:
  a gripping device supported by an elongated pivotal arm and extending from the elongated arm to a free end; and a gripper disposed at the free end of the gripping device, the gripper including a screw or screws installed in a functional platform of the gripper;

such that the robot is set in motion for the gripper to perform gripping of a target rubber block arranged in a container during a picking process performed by the robot.

In some embodiments of the supply installation of the invention, the robot includes one or more load cells having a function of weighing the rubber blocks picked by the gripper during a picking process.

The invention is also directed to a flow control process for generating substantially automated flow control in a rubber product production site using rubber blocks of rubber mixtures of predetermined weight and volume, characterized in that the process includes the following steps:

a step of recovering the containers containing rubber blocks identified to satisfy a rubber product production campaign;

a step of transporting the recovered containers to the supply installation of the site, during which each recovered container is identified with an associated rubber mixture nature, the supply installation including:

an input station where the supply installation performs a process of entry of empty bins for receiving rubber blocks identified during a picking process;

a discharge station where the supply installation performs a process of discharging full bins containing the picked rubber blocks;

a supply means that manages the transport of the empty bins and the full bins to the supply installation; and a picking station to which the recovered containers are transported, that performs a process of picking the rubber blocks grouped in a container according to the status of the current rubber product production campaign;

a clamping step during which the picking station performs a clamping process; and a picking step during which the picking station performs a process of picking the rubber blocks gathered in the container for transfer to a target location.

In some embodiments of the process of the invention, the process further includes the following steps:

a step of introducing the empty bins at the supply installation, during which the empty bins are introduced at the input station according to the number of bins to be filled during a picking process performed by the picking station; and a step of discharging the full bins from the supply installation, during which the full bins are discharged from the discharge station according to the throughput of the current campaign.

In some embodiments of the process of the invention:

a clamping process is performed by at least one automated cell of the picking station; and a picking process is performed by at least one robot of the picking station.

In some embodiments of the process of the invention, the clamping process includes the following steps:

a step of positioning a container in the cell;

a locking step during which the container is clamped in the cell; and a clamping step during which the container is held in its position in the cell.

In some embodiments of the process of the invention, the picking process includes the following steps:

a step of determining one or more parameters of a target rubber block among the rubber blocks grouped in the clamped container;

a step of directing a robot toward a target rubber block identified for picking from the clamped container during the clamping process; and a step of retaining the target rubber block;

a step of removing the target rubber block from the clamped container; and a step of depositing the captured rubber block in a target location including at least one empty bin in waiting on the supply means.

In some embodiments of the process of the invention, the robot repeats one or more steps of the picking process in a predetermined order in order to construct the bins full of rubber blocks that satisfy the current rubber product production campaign.

Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which:

FIG. 2 represents a schematic view of an embodiment of a supply installation of the site of FIG. 1.

FIG. 3 represents an embodiment of a flow control process of the invention performed by the supply installation of FIG. 2.

FIG. 4 represents a perspective view of an embodiment of an automated cell of the supply installation of FIG. 2.

FIG. 5 represents a perspective view of an embodiment of a robot of the supply installation of FIG. 2.

FIG. 6 represents a front perspective view of an embodiment of a gripper of the robot of FIG. 5.

FIGS. 7, 8, and 9 represent configurations of supply bins arriving at the supply installation of FIG. 2.

DETAILED DESCRIPTION

Figure 1:
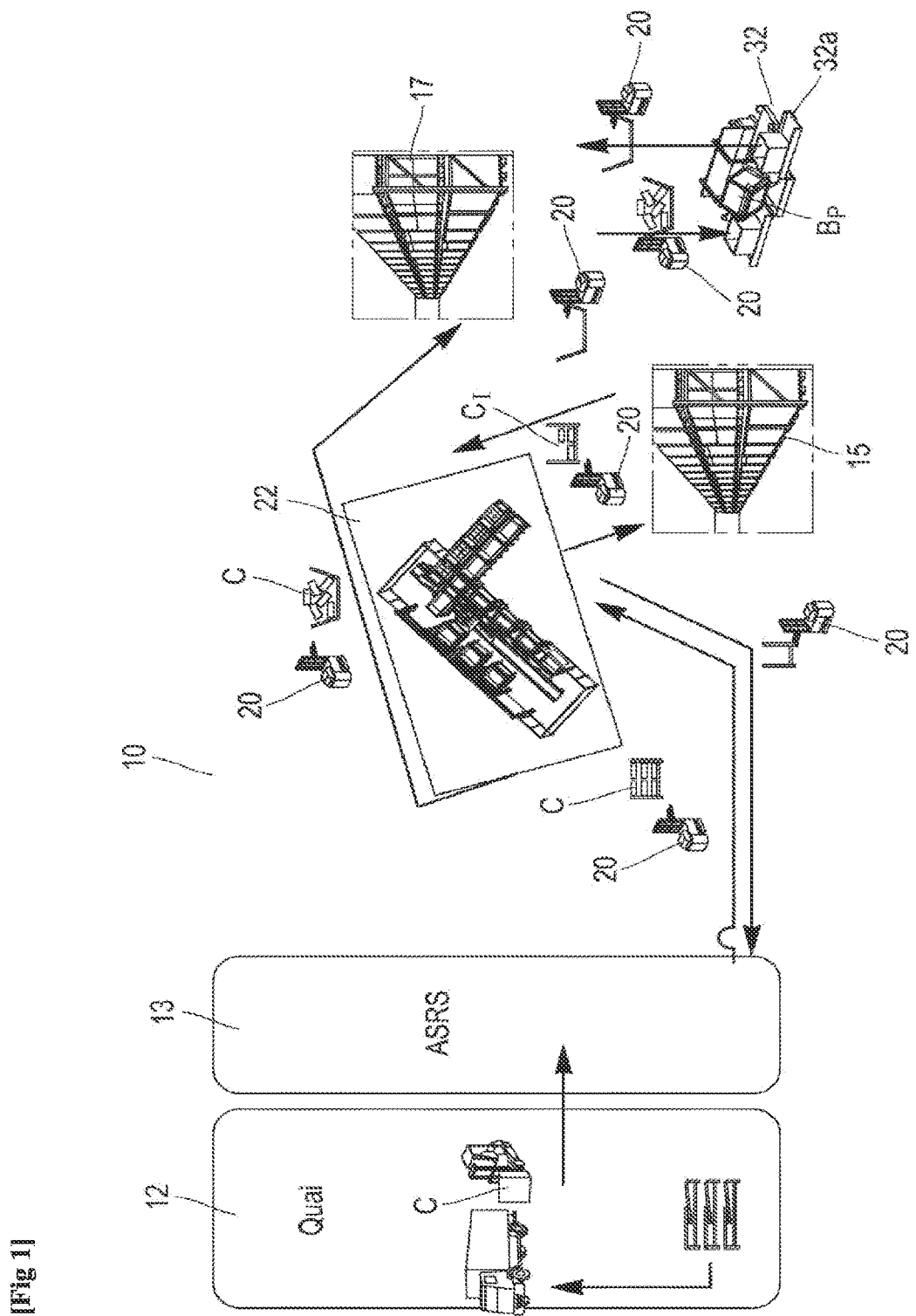
FIG. 1 represents an embodiment of an automated flow control in a rubber product production site.

The invention relates to a system and process for generating substantially automated flow management (or "flow control") of rubber blocks of rubber mixtures in a rubber product production facility (or "site"). As used herein, the term "flow" refers to a movement of identified rubber blocks among production installations at a site. The term "flow" also refers to a specified time for completing the movement of rubber blocks in a rubber product production cycle. The units of time used can be seconds, minutes, hours, days, weeks and months. The units of time used can be equivalents of these, for example, a time remaining until a site can attain the best flow of rubber blocks in the site.

The flow control is performed according to a current production campaign. The term "campaign" refers to the duration of operation, with the same recipe, of a production installation at the site. Future planned campaigns are generated by identifying and forecasting identified rubber mixtures, being in specified quantities during a specified period. The specified period depends on the status of the current and future campaigns.

Referring now to the figures, in which the same numbers identify identical elements, FIG. 1 represents an embodiment of an automated flow control in a rubber product production site 10. In order to optimize their storage, retrieval and shipment among the installations of the site 10, the rubber blocks arriving at the site (at a dedicated dock 12, for example) are grouped according to their common properties (for example, in a supply container, or "container", C as shown in FIG. 1, on a pallet or pallets or in other equivalent containers). The pooled rubber blocks are transported to one or more storage unit(s) 13, 15 at the site 10 (e.g., by autonomous vehicle(s) such as the AGVs 20 shown), which include automated storage systems (e.g., automatic storage and retrieval systems or "ASRS" and equivalents thereof). The storage units 13, 15 serve to satisfy the current requirements of the flow and to indicate the completion of the current production process. It is understood that the flows can be classified using self-learning approaches in which some flows are more desirable than others (e.g., based on the properties of the rubber products being manufactured).

Each container C may be characterized by a unique identification (e.g., using numbers, codes, RFID identifications, hyperlinks, recognition means, and/or equivalent means) by which a controller (e.g., a PLC or equivalent control system) can identify the rubber blocks in the containers in order to determine additional information (e.g., to update the arrival time and storage duration of the identified rubber blocks at one or more storage unit(s) 13, 15). By means of an identification means integrated with the containers C, the rubber blocks and their properties are identified, known and managed.

Referring again to FIG. 1 and further to FIG. 2, the containers C containing the identified rubber blocks (including incomplete containers $C_I$) are retrieved from the storage unit(s) 13, 15 of the site 10 for transfer to a supply installation 22 of the site. The supply installation 22 facilitates the control of automated flows of rubber blocks intended for use in a production process or processes downstream of the supply installation. The supply installation 22 allows for management of the receipt, identification, transfer, storage, and output of rubber blocks that satisfy the current production campaign. Thus, during a given production run, rubber blocks with desired properties are precisely directed toward the intended production process or processes.

The supply installation 22 includes an input station 24 where the supply installation performs a process of entry of empty bins $B_V$ intended to receive rubber blocks during a picking process (see arrow I in FIG. 2). The supply installation 22 also includes a discharge station 26 where the supply installation performs a process of discharging full bins $B_P$ containing the picked rubber blocks (see arrow II of FIG. 2). The introduction of the empty bins $B_V$ at the input station 24 and the discharge of the full bins $B_P$ from the discharge station 26 are effected by known means (e.g., by autonomous vehicle(s) 20 as shown in FIG. 1).

Depending on the current status of the current campaign, a supply means 28 of the supply installation 22 transports the empty bins $B_V$ from the input station 24 to a picking station 30 where the supply installation performs a picking process of the rubber blocks selected for the current campaign (discussed below). In the embodiment shown in the figures, the supply means 28 includes a belt sliding on a rail. It is understood that any equivalent means may be employed that transports empty and full bins at the supply installation 22 (including, without limitation, endless belt(s), transport shuttle(s), and other known conveyor(s)).

Identification means(s) (e.g., RFID readers, sensors, and/or their equivalents) may be installed (either on the supply installation 22 or on the autonomous vehicles 20) to check the status of a particular bin (either empty or full). The supply installation 22 thus allows for the identification, management and incorporation of available rubber mixtures during a rubber product production cycle.

Referring again to FIG. 2 and further to FIGS. 3 and 4, the supply installation 22 further includes a picking station 30. It is understood that the term "picking" includes the functions of depositing and picking up rubber blocks grouped in a container C waiting at a cell 100 of the picking station, or in another dedicated space, as well as the target arrangement of the rubber blocks. During a rubber product production cycle performed by the site 10, the containers C containing the grouped rubber blocks allow the filling of empty bins $B_V$ and the discharge of full bins $B_P$ according to the status of the current campaign (the arrival of empty bins and the discharge of full bins being managed by the supply means 28)(see arrow III of FIG. 2). After the completion of a picking process, during which the rubber blocks of the containers C are grouped in corresponding bins, the supply means 28 transports the full bins to the discharge station 26 to facilitate their transport from the supply installation 22.

Referring to FIG. 3 and further to FIG. 4, in an embodiment of the supply installation 22, the picking station 30 includes automated cells (or "cells") 100. Each cell 100 is capable of handling, during a clamping process performed by the cell, a variety of containers C into which the rubber blocks are grouped (e.g., based on color, size, shape, hardness, stickiness, and/or other rubber mixture properties). It is understood that at least one container C may be assigned to each cell 100 of the picking station 30. It is understood that the term "target location" (singular or plural) includes an empty bin $B_V$ where the target rubber blocks, arranged in the container C, are intended for grouping. During a picking process, one or more rubber blocks are taken out of the containers C and arranged in empty bins $B_V$ transported by the supply means 28. The rubber blocks can be stored in the containers C without knowledge of their arrangement.

The cell 100 includes a clamping system, a container locking system (or "locking system") and an automatic container centering system (or "centering system"). The clamping, locking and centering systems are incorporated into a frame 102 of the cell 100 that allows for the fixed installation of the cell (e.g., by support plates 101 and/or by fasteners 103). It is understood that the configuration of the frame 102 can be modified as a function of the footprint of the cell 100 and/or the supply installation 22 (and particularly the picking station 30).

The embodiment of the frame 102 shown includes a pair of longitudinal members 104 spaced apart by a predetermined distance (e.g., a distance to allow loading of a container C of corresponding dimensions into the cell 100). Each member 104 extends along a predetermined length between an attachment end 104a and an opposite end 104b. A crossbar 106 may join the opposite ends 104b of the members 104 to define an entrance that allows loading of a container C into the cell 100.

The frame 102 also includes a pair of lower supports 108 and a pair of upper supports 110 that extend substantially perpendicular to each member 104. Each pair of lower, upper supports 108, 110 is arranged in parallel with each other along the length of each member 104 and aligned with the corresponding supports. Each lower, upper support 108, 110 extends along a predetermined length between a respective attachment end 108a, 110a, where the support is attached to a corresponding member 104, and a respective opposite free end 108b, 110b (the lengths of the supports being substantially equal). The lower, upper supports 108, 110, together with the members 104, together define a loading space 112 that facilitates the depositing of a container C in the cell 100. It is understood that the number and precise positioning of lower, upper supports 108, 110 can be varied and are not limited to the embodiment shown in the figures.

The centering system of the cell 100 includes guiding means that allow for precise positioning of the loaded container C in the loading space 112 of the cell. In one embodiment of the cell 100, the guiding means includes a pair of guides 114 aligned at the cell entrance, with one guide 114 being installed along the length of each member 104 (e.g., relative to a mechanical stop(s) 115 as shown in FIG. 4). In one embodiment of the cell 100, the guiding means also includes a posing platform (or "platform") 116 installed on the frame 102 along the bottom supports 108. The platform 116, together with the frame 102, provides a drop-off space where the container C is managed and held in the loading space 112. In one embodiment, the platform 116 includes at least one series of rollers 116a for moving the container into the loading space 112. It is understood that the number of roller series, the number of rollers in each series, and their arrangement may be varied depending on the containers being managed.

Referring again to FIG. 4, the clamping system of the cell 100 includes a pivoting chassis (or "chassis") 118 installed on the frame 102. The chassis 118 includes two lateral sides 120, a longitudinal side 122, and a clamping member 124 that together form a tiltable, substantially rectangular holding frame for a container C loaded in the loading space 112 of the cell. In instances where a plastic bag is held around a rubber block or blocks during loading of the container C into the cell 100, the chassis 118 holds the container and the plastic bag.

The lateral sides 120 of the chassis 118 are substantially parallel, and each lateral side 120 includes a lower edge and an upper edge extending between a starting end and an opposite stopping end. The longitudinal side 122 joins the stopping ends of the lateral sides 120, and the clamping member 124 joins the starting ends to form the tiltable holding frame. The longitudinal side 122 incorporates a fastening means along a lower edge of the longitudinal side that allows the chassis 118 to be tilted between a standby position (where the chassis 118 remains tilted to allow loading and positioning of a container C in the loading space 112 of the cell 100) and a clamping position (where the chassis 118 descends)(for example, to clamp the plastic bag of the box if present). The chassis 118 is tilted between the standby position and the clamping position by a cylinder or cylinders or equivalent clamping system actuator or actuators (not shown).

In an embodiment of the cell 100, the chassis 118 also includes one or more pivoting flaps (or "flaps") that can pivotally move up and down. In the embodiment shown, one or more side flaps $V_{120}$ are installed along the top edge of each sidewall 120a. In this embodiment, a longitudinal flap $V_{122}$ may be installed along the upper edge of the longitudinal side 122. In one embodiment of the chassis 118, each lateral and longitudinal flap $V_{120a}$, $V_{120b}$ includes a rubber strip that protects it from impact. Each side and longitudinal flap $V_{120a}$, $V_{120b}$ pivotally moves up and down allowing a plastic bag to be pressed against a corresponding container C packed in the plastic bag. In this way, the plastic bag is held in place to prevent it from obstructing a picking zone during a picking process performed at the picking station 30. Each lateral and longitudinal flap $V_{120a}$, $V_{120b}$ is pivoted by one or more plating actuator(s) or equivalent clamping system actuator(s) (not shown). In embodiments of the cell 100 incorporating a pivoting flap or flaps, the container is held in its intended position in the cell 100 without damage to the chassis 118 regardless of the presence of a plastic bag.

Extraction of the rubber blocks from the container C generates a significant amount of force that can lift and/or move the container. The cell 100 therefore includes the locking system incorporating a pivoting barrier 130 that ensures that the container is held in the loading space 112 of the cell. The barrier 130 is installed on the frame 102 proximate the free ends 108b of the bottom supports 108. The barrier 130 moves up and down in a pivoting (or translational) manner allowing it to be tilted between an unlocked position (where the barrier 130 remains tilted to allow loading and positioning of the container C in the loading space 112 of the cell 100) and a locked position (where the barrier 130 moves up to block and abut the container C in a known plane). Thus, the locking system maintains the container C in the loading space 112, including during the picking processes performed at the picking station 30.

The cell 100 may further include sensor(s) for detecting the presence of a container C in the loading space 112, which may trigger a clamping process performed by the cell. Other sensors with other functions may be provided for use with the cell 100 to perform the clamping processes based on properties of the container C (e.g., its dimensions, positioning, rubber block arrangement, presence or absence of plastic bags, etc.). For example, the cell 100 may include sensor(s) to collect data corresponding to the container C and its positioning relative to the loading space 112 of the cell 100.

It is understood that the term "sensor" (singular or plural) may refer to one or more devices (including photos, cameras, and/or optical sensors). These devices may be configured to perform two-dimensional (2D) and/or three-dimensional (3D) image sensing, 3D depth sensing, and/or other types of sensing of the physical environment. Using the captured data, the operation of the clamping, locking, and centering systems of the cell 100 is well managed in real time.

In one embodiment of the supply installation 22 incorporating the cell 100, the data collected by the sensors may be used in the control of an apparatus that performs the picking of the target rubber blocks arranged in the container C. Referring to FIGS. 2 and 3 and further to FIGS. 5 and 6, one embodiment of such an apparatus includes a robot 200 of the picking station 30 that performs a process of picking the rubber blocks grouped in the containers C. The robot 200 is operatively arranged with respect to the cells 100 (where the containers C are managed) and with respect to the supply means 28. As an example, in FIG. 2, the supply means 28 includes a belt that carries the robot 200 and an empty bin $B_V$ to position them relative to the cells 100. The robot 200, together with the cells 100, performs the picking process at the picking station 30.

The cell 100 (and/or a system incorporating the cell 100) may include pre-programming of control information. For example, a setting for the picking process may be associated with parameters of the physical environment around the picking station 30. In embodiments of the supply installation 22, the cell 100 may receive voice commands or other audio data representing, for example, a start or stop of the cell 100 and/or a loading/unloading of the container C into the loading space 112. A generated response may be represented audibly, visually, tactilely (e.g., using a haptic interface)

and/or in a virtual and/or augmented manner. This response, together with corresponding data, may be entered into a neural network.

The picking process may incorporate a method of calculating the shape of a target rubber block. It is understood that the term "target rubber block" (singular or plural) includes a rubber block that is present in the physical environment of the robot 200 and is identified for picking during the picking process performed at the picking station 30.

The robot 200 may be a static robot or a mobile robot. By "mobile" it is understood that the robot 200 may be set in motion either by integrated motion means (e.g., integrated motor(s)) or by non-integrated motion means (e.g., stand-alone mobile cart(s) or other equivalent mobile means). It is understood that the robot 200 may be attached to a floor, ceiling, wall, or any support that permits performance of the picking process at the picking station 30. It is understood that the robot 200 may be a conventional industrial robot or a collaborative robot or even a delta or cable robot. In one embodiment, the robot 200 may be of the "Cartesian" type that allows the control of its movement relative to the supply means 28.

Referring again to FIG. 6, the robot 200 includes a gripping device 202 supported by an elongated pivotable arm 204. The gripping device 202 extends from the elongated arm 204 to a free end 202a where a gripper 206 is disposed along a longitudinal axis 1-1. The robot 200 is set in motion so that the gripper 206 can perform a pickup of a target rubber block during a picking process performed by the robot. The initial positioning of the robot 200 and the initial orientation of the gripper 206 may be determined from data obtained via image acquisition and the physical environment around the picking station 30. Sensors of the sensing system incorporated with the robot 200 may be attached to the elongated arm 204 and/or the gripper 206 of the robot.

One embodiment of the gripper 206 includes a housing 208 having a predetermined length between an attachment end 208a and a gripping end 208b. The housing 208 includes supports 210 that extend between an attachment platform 212 disposed at the attachment end 208a and a functional platform 214 disposed at the gripping end 208b. By way of example, three supports 210 are shown in FIG. 6, but it is understood that the number of supports may be variable (e.g., depending on the length of the housing 208).

The attachment end 208a may include an adapter 216 integrated with the attachment platform 212 that allows for removable attachment of the housing to the robot 200. Attachment of the housing 208 to the robot 200 may be accomplished by screwing the adapter 216 to the free end 202a of the gripping device 202 (accomplished, for example, by a known screw or screws). It is understood that the attachment of the housing 208 to the robot 200 may be achieved by a known equivalent attachment means(s) (including, without limitation, welding, gluing, threading, and equivalents thereof).

The gripper 206 includes a screw or screws 220 installed in the functional platform 214 such that each of the screws can be rotated. The screws 220 may be integral, or they may be removable, with respect to the functional platform 214. The functional platform 214 allows the screw(s) 220 to be installed in a substantially equilateral geometry (e.g., a substantially square shape).

The speed and direction of rotation of the screw(s) 220 is managed by a motor $M_{206}$ supported in the housing 208 by the functional platform 214. The motor $M_{206}$ controls the relationship between the rotational speed and the pitch of a screw with the linear advance of the robot 200 to allow the screw to be screwed into the target rubber block without tearing the rubber block. In one embodiment, the motor $M_{206}$ includes a commercially available motor that allows the speed and/or linear position of each screw to be synchronized with respect to a target rubber block (e.g., a so-called "brushless" type motor). Whatever the configuration of the motor $M_{206}$, it is dimensioned to achieve a well-adapted gripping speed and an optimal pose according to the shape and dimensions of the target rubber block. In the embodiment shown, the motor $M_{206}$ includes a geared motor incorporating gears 223 to minimize the weight of the gripper 206 and the size of the robot 200 carrying it.

Each screw 220 may be selected from known screws, including conical-type screws (not shown) and "endless" or "corkscrew" type screws. Each screw 220 includes a predetermined height that extends between a low portion at the end of the screw, where one extremity 221 of the screw pierces the outer surface of the target rubber blocks, and an opposite high portion, where the rotational speed and linear movement of the screw is controlled. It is understood that several embodiments of the screws 220 may be used by the robot 200. The robot 200 may select the necessary screws to be installed on the gripper 206 based on the parameters of the picking process being performed at the picking station 30. One or more screws 220 can be machined as needed, and the machined screws can be used together (or combined) with the screws being used. Thus, the invention provides adaptability to the robot 200 (and particularly to the gripper 206) for processing rubber blocks regardless of their parameters or shapes.

The number of screws 220 is adjustable to enable quick mounting and dismounting of the screws as needed for the picking process of the intended rubber block. One or more screws 220 may be installed at the gripper 206 to optimize its gripping capacity (for example, to match the grip to the dimensions of the target rubber block), to optimize the holding force of the target rubber block, and to have the ability to grip one or more rubber blocks at a time with an adjustable number of screws.

Referring again to FIGS. 5 and 6, and particularly to FIG. 6, the gripper 206 further includes one or more load cells 222. In one embodiment, the load cell 222 is integrated with the gripper 206 (e.g., at the attachment end 208a as shown in FIG. 6). The load cell 222 has the function of weighing the rubber block(s) picked up by the gripper 206 during a picking process. By predicting the weight of a rubber block for extraction, and then verifying that weight, the load cell 222 ensures extraction of the rubber blocks by regulating the extraction force and speed with the control of the screw speed 220. Thus, correct dosing of the rubber blocks is attained because the picking up and the posing of the rubber blocks is well-regulated and controlled.

The gripper 206 further includes means for measuring a presence of a target rubber block and/or its positioning relative to the gripper (and particularly relative to a screw or screws 220 of the gripper). In one embodiment, the measuring means includes one or more laser range finders 224 incorporated into the gripper (for example, being installed at the functional platform 214). Each laser range finder 224 is capable of verifying the positioning height of a target rubber block picked up by the gripper 206 during a picking process (an initial height being determined, for example, by a vision system). Each laser range finder 224 verifies the pickup and removal of a target rubber block via detection of its presence or absence relative to the corresponding screws 220. To ensure optimal pickup of a target rubber block, the laser range finder 224 also measures the screw-in height of a rubber block by determining the depth of a screw 220 inserted therein. In response to the measurement data captured by the laser range finders 224, the robot 200 can manipulate the gripper 206 to tilt the gripper 206 so that it is positioned perpendicular to the block regardless of the tilt of the rubber block in the corresponding bin. Thus, inserting the screws 220 into the rubber block at the same depth level optimizes the grip of the target rubber block.

It is understood that the robot 200 may include a sensing system that uses one or more sensors (not shown) to gather information about the physical environment around the robot. The sensors of the sensing system incorporated with the robot 200 may be attached to the elongated arm 204 and/or the gripper 206 of the robot.

In embodiments of the supply installation 22 incorporating the cell 100 and the robot 200 at the picking station 30, a vision system (not shown) may be used to detect the presence of an arrangement of rubber blocks within the field of view of a camera of the vision system, which triggers the camera to capture the image of a rubber block or blocks. In cases where a portion of the target rubber block is not visible in the camera image, an arbitrary point may be placed at a known position relative to the sensor of the sensing system (e.g., at a known horizontal distance and a known vertical distance from the sensor position). The sensors of the cell 100 and the sensors of the robot 200 may thus provide information about the physical environment around the picking station 30, which may be used by a control system (that includes, for example, software for planning clamping of the cell 100 and/or corresponding movements of the robot 200 relative to the movement of the supply means 28). The control system could be in remote communication.

In some embodiments, one or more sensors mounted on the robot 200 (including, without limitation, navigation sensors) may be integrated to form a digital model of the physical environment of the supply installation 22 (including, where applicable, the side(s), floor and ceiling of the site 10). Using the obtained data, the control system may cause the robot 200 to move (for example, to navigate the robot based on the positioning of the container C and the positioning of one or more empty bin(s) $B_V$ on the supply means 28).

The robot 200 may include pre-programming of control information. For example, a setting for the picking process may be associated with parameters of typical physical environments around the picking station 30. In embodiments of the supply installation 22, the robot 100 may receive voice commands or other audio data representing, for example, a start or stop of rubber block pickup, a start or stop of movement of the robot 200, and/or manipulation of the gripper 206. A generated response may be represented audibly, visually, tactilely (e.g., using a haptic interface) and/or by virtual and/or augment means. This response, together with corresponding data, may be entered into a neural network.

In one embodiment, the picking process may include a step of training the robot 200 (or training the supply installation 22 incorporating the robot 200) to recognize values representative of the natures of the rubber blocks (e.g., viscosity values) and to make a comparison with target values (e.g., to simulate a rubber mixing recipe incorporating the recovered rubber blocks). This step may include the step of training the robot 200 to recognize non-equivalences between the compared values. Each training step includes a classification generated by self-learning means. This classification may include, without limitation, the parameters of the selected mixing recipes, the screw configurations 220, the cycle times of the picking processes, and the expected values at the end of the picking process in progress (e.g., the weight of the rubber blocks posed in the target location).

Referring again to FIGS. 1-6, and particularly to FIG. 3, a detailed description is given as an example of a flow control process (or "process") of the invention performed by the supply installation 22 (or by the site 10 incorporating the supply installation 22). It is understood that the supply installation 22 allows for advantageous modularity to avoid time wasted waiting for the arrival of the containers C. For example, one or more robots 200 can be arranged between two lines of cells 100 depending on the flows established during a campaign. In the event that a cell is missing a container, the robot(s) 200 continue their picking functions using any containers already loaded at the other cells. In other examples, the picking station 30 can handle bins arriving in different configurations, including "U" configurations (see FIG. 7), "I" configurations (see FIG. 8), "L" configurations (see FIG. 9), and any other configurations to optimize campaign attainment.

FIG. 3 shows the supply installation 22 where an empty bin $B_{V1}$ is transported by the supply means 28 to the picking station 30. The empty bin $B_{V1}$ arrives at the picking station 30 with waiting containers C having rubber blocks grouped therein by their rubber nature. Each nature is typically supplied as a rubber block of predetermined weight and volume. As shown in FIG. 3, the rubber blocks are intended to be grouped by rubber types A, B, C. It is understood that a different number of rubber types can be processed depending on the rubber products being manufactured and their desired properties.

In initiating a flow control process of the invention, the process includes a step of recovering the containers C containing the identified rubber blocks that satisfy a production run of rubber products. The containers C are recovered from one or more storage units (either storage unit 13 or storage unit 15) (see FIG. 1).

This step includes a step of identifying the rubber compounds that satisfy at least one current rubber product production campaign. Considering the time required to assemble the natures of rubber mixtures needed to realize the rubber product being produced, containers can be identified according to the minimum time allowed to realize the production. The time units used can be seconds, minutes, hours, days, weeks and months. The units of time used may be equivalents thereof, for example, a time remaining until the supply installation 22 recognizes the arrival of a number of containers sufficient to complete production of a number of selected rubber products.

The supply installation 22 may record when each retrieved container C arrives (the day, time, moment, etc.) to enable management of the storage duration of the rubber mixtures at the storage units 13, 15. The containers of rubber mixtures and/or their locations in the storage units 13, 15 may be visually or otherwise identified by one or more known means (e.g., one or more RFID means, by bar codes, etc.) to indicate from which area the containers should be retrieved. In one embodiment, to ensure the use of rubber mixtures whose use-by date has not been exceeded, a command to retrieve the containers is made after a determination of a duration of their storage. In this embodiment, the order is made to retrieve the containers filled with the rubber mixtures having the longest storage time, these containers being identified to satisfy the current campaign. These identified containers are retrieved before the containers with a shorter storage time.

The flow control process further includes a step of transporting the recovered containers C to the picking station 30 of the supply installation 22. During this step, each recovered container C is identified with the associated nature of the rubber mixture. By the time each recovered container arrives at the supply installation 22, the rubber mixture has already been deemed suitable for the current production campaign. If the rubber mixtures stored in the storage units 13, 15 do not satisfy the current campaign, a future campaign that will use available rubber mixtures can be prioritized. The current inventory and projected inventory in the storage units 13, 15 can be dynamically monitored to dynamically rank production campaigns so that at least one production campaign is always feasible.

The flow control process further includes a clamping step during which the picking station 30 performs a clamping process. The clamping process includes a step of positioning a recovered container C in the loading space 112 of the cell 100. During this step, the chassis 118 remains in the standby position, and the barrier 130 remains in the unlocked position. In embodiments where the frame 102 incorporates the platform 116, the platform 116 (with or without rollers 116a) guides the container C onto the platform during this step. During this step, the installation of which the cell 100 is a part is shut down and secured to allow uninterrupted access to the container C. A safety management system allows the robot 200 to continue working in other cells 100. Only cells 100 that are being loaded and unloaded are secured to prevent the robot 100 from coming into that area.

The clamping process further includes a locking step to press the container C against the frame 102 of the cell 100. During this step, the detection of the presence and the correct positioning of the container allows the displacement of the barrier 130 from the unlocking position to the locking position to block and maintain the container C. This configuration, which ensures that the container C is held in the loading space 112, also optimizes a working area of an apparatus that processes the rubber blocks arranged in the container (e.g., robot 200).

In embodiments of the cell 100 incorporating side flaps $V_{120a}$ and/or a longitudinal flap $V_{120b}$, the locking step further includes a step of lowering the flaps to come to rest against the corresponding container C. In cases where there is a plastic bag, the flap(s) come to rest against the plastic bag to hold it in place.

The clamping process further includes a clamping step to position the tiltable holding chassis. During this step, the chassis 118 moves from the standby position to the clamping position to press the container C against the frame 102 and to clamp the plastic bag of the container.

In an embodiment of the clamping process, one or more process steps may further include a step of scanning the physical environment around the picking station 30 to arrive at an accurate positioning of the container C. During this step, the supply installation 22 and/or a rubber block picking apparatus (e.g., robot 200) may use one or more sensors to capture data corresponding to the clamped containers and the rubber blocks grouped therein to determine the shapes and/or positions of the individual rubber blocks. This information is relevant to understanding the arrangement of the rubber blocks and determining the best candidate for pickup among the rubber blocks grouped in an identified container C. This best candidate selection strategy allows for accurate modeling of the clamping process to optimize the time of an associated production cycle.

The clamping process can be done by the PLC control and can include pre-programming of control information. For example, a setting for the clamping process may be associated with the slope that is provided to the cell 100, and/or the properties of the mixture of the rubber blocks in a container C managed by the cell 100 (including the properties of the rubber nature(s) associated with the corresponding containers C and/or the presence of plastic bags). The cell 100 (and/or the supply installation 22 incorporating the cell 100) can readily repeat one or more steps of the clamping process in a specified order to properly supply the rubber blocks to achieve a desired batch.

The flow control process further includes a picking step during which the picking station 30 performs a picking process. The picking process includes a step of approach of the robot 200, and particularly the gripper 206, toward a target rubber block identified for picking from the container C clamped during the clamping process. During this step, the gripper 206 is controlled to come into close proximity with the outer surface of the target rubber block. Simultaneously, the screws 220 rotate in a predetermined direction of rotation to effect retention of the target rubber block by the screws.

The picking process further includes a step of determining a parameter or parameters of a target rubber block in the rubber blocks grouped in the clamped container C. The relevant parameters of the rubber block may be determined, for example, from a reference of the rubber block dimensions or generated by an equation (e.g., calculation of an area of a target rubber block). During this step, a distance between the extremity 221 of each screw 220 and a top surface of the target rubber block is determined by the corresponding laser range finder 224. During this step, the robot 200 may obtain digital image(s) of the rubber blocks grouped in a container to identify the rubber block(s) for picking. During this step, the robot 200 may use one or more sensors to scan a physical environment around the picking station 30. The gripper device 202 and/or the elongated arm 204 moves, with one or more sensors on the gripper device and/or elongated arm being able to capture data corresponding to the grouped rubber blocks to determine the shapes and/or positions of the individual rubber blocks.

The picking process further includes a step of retaining the target rubber block during which the gripper 206 is put in movement until the extremity 221 of the screw 220 engages a corresponding grip point of the top surface of the target rubber block. The movement of the gripper 206 during this step continues until the extremity 221 of the screw 220 pierces the top surface of the target rubber block bar to screw it in. During this step, the laser range finder 224 measures (either continuously or at predetermined intervals) the depth of the piercing performed until an intended piercing depth is reached, which ensures the retention (and thus the gripping) of the target rubber block. This piercing depth is established based upon the properties of the rubber block (including, without limitation, its length, width, thickness, viscosity, etc.). During this step, the gripper 206 advances the screw 220 until the laser range finder 224 determines that the extremity 221 of the screw reaches the intended piercing depth. When the extremity 221 of the screw 220 reaches the intended piercing depth, a stop of the rotation of the screws 120 is performed to prevent tearing of the rubber block.

During this step, the torque of the motor $M_{206}$ can be monitored during the retaining process. The motor $M_{206}$ may stop when the monitored torque exceeds its set threshold. It is understood that extraction of the target rubber blocks requires the ability to position the gripper 206 at different pickup points. Thus, it is understood that gripping of a target rubber block or blocks may be accomplished from the center, side, or corner of the target rubber block. The gripper 206 is thus capable of pulling out a target rubber block by peeling it from a corner, which requires the ability to adjust a positioning angle of the gripper relative to the intended rubber block for gripping (for example, a positioning angle between 0° and 90°).

The picking process further includes a step of extracting the target rubber block from the clamped container C, during which the retention of the target rubber block is maintained. During this step, the load cells 222 determine the weight of the target rubber block(s) picked up by the gripper 206. For this purpose, the load cells 222 take into account the load of the pick and check whether this load corresponds to the intended weight of the pick. Thus, the positioning angle of the gripper 206 and also its speed can be adjusted.

In embodiments of the picking process, this step includes a step of vertically pulling the target rubber block from the other rubber blocks arranged in the container. The vertical detachment of the block includes a peeling step during which the target rubber block is removed (or "peeled") in a direction normal to the outer surface of an adjacent rubber block. In the event that the target rubber block picked up by the gripper is stuck to other rubber block(s) grouped in the clamped container flanged C (e.g., by the so-called "suction cup" effect), the target rubber block can be peeled off from the other rubber blocks(s) at any peel angle without decreasing the quality of the retention of the target gum cake by the screws 220.

In some embodiments of the picking process, the vertical detachment of the rubber block includes a motion control step. During this step, a perpendicular movement of the gripper is made to tilt the target rubber block retained by the gripper. During this step, the gripper 206 may perform a rotation (either partial or complete) of the target rubber block to ensure stable orientation of the rubber block without decreasing the quality of the retention.

The picking process further includes a step of posing the target rubber block in a target location. The target location includes the empty bin $B_{V1}$ waiting on the supply means 28. This step includes a step of transporting the target rubber block to the waiting empty bin $B_{V1}$, this step being performed by the robot 200. During its transfer from the container C to the waiting empty bin $B_{V1}$, the gripper 206 keeps the target rubber block well oriented until it is posed in the empty bin. This step further includes a release step during which the screws 220 rotate in a predetermined direction of rotation to effect release of the target rubber block by the screws when the target rubber block is properly posed in the empty bucket $B_{V1}$.

The posing step further includes an exit step of the gripper 206 that is performed after the target rubber block is deposited in the target location (the empty bin $B_V$) and simultaneously with the release step of the screws 220. During this step, the gripper 206 is set in motion until the extremity 221 of the screw 220 exits the top surface of the target rubber block. At this point, the rotation of the screws may stop. Movement of the gripper 206 is performed until the gripper exits the target location (the empty bin $B_V$) to resume a position where the gripper can pick up the next identified rubber block for picking.

A cycle of the picking process of the invention can be done by the PLC control and can include pre-programming of control information. For example, a picking process may be associated with the properties of the screws 220, the properties of the mixture of the rubber block picked up by the gripper 206, and the properties of the target location (the empty bin $B_V$). The robot 200 (and/or the supply installation 22 incorporating the robot 200) can easily repeat one or more steps of the picking process in a well-defined order that ensures optimized consistency to build the bins $B_P$ full of rubber blocks that satisfy the current campaign.

The flow control process of the invention further includes a step of introducing empty bins $B_V$ to the supply installation 22. During this step, the empty bins $B_V$ are introduced at the input station 24 by autonomous means (e.g., by autonomous vehicle(s) 20) depending on the number of bins to be filled during a picking process performed at the picking station 30. Empty bins $B_V$ can be retrieved from the storage unit(s) 13, 15 in real time to anticipate the need of the current production campaign. In an embodiment, incomplete bins $B_I$ may be treated as empty bins and thus stored in the storage unit(s) 13, 15 (see FIG. 1).

The flow control process of the invention further includes a step of discharging full bins $B_P$ from the supply installation 22. During this step, the full bins $B_P$ are discharged at the discharge station 26 (for example, by autonomous vehicle(s) 20) depending on the rate of the current campaign. The full bins $B_P$ may be retrieved from the discharge station 26 and they may be sent to a subsequent production process. The full bins $B_P$ may be stored at the storage unit 17 pending an order for their use during a subsequent process (with storage unit 17 including an automated storage system of the type described above with respect to storage units 13, 15).

It is understood that the step of introducing empty bins $B_V$ and/or the step of discharging full bins $B_P$ can be performed at any time during the flow control process of the invention. The flow control of the introduction and discharge of empty and full bins is an important element of the overall rubber mixture management for satisfying the defined campaign.

The operation of the robot 200 makes it easier to handle the full bins $B_P$ during downstream processes at the supply installation 22. For example, to satisfy the current campaign, a tipping process can be easily performed at a blocking facility 32 at site 10 (see FIG. 1). During the tipping process, the full bins $B_P$ arrive at the blocking facility 32 having already been judged to include the rubber blocks necessary to achieve a desired batch. Each full bin $B_P$ can simply be tipped so that the rubber blocks fall onto a belt 32a. The belt 32a transports the dropped rubber blocks to one or more standby mixers that perform corresponding mixing processes.

In an embodiment, the control process of the invention may include a step of training the supply installation 22 (or training the site 10 incorporating the supply installation 22) to recognize values representative of the full bins $B_P$, empty bins $B_V$, and/or the natures of the rubber blocks associated with the containers C (e.g., temperature and viscosity values) and to make a comparison with targeted values (e.g., to make a batch incorporating the rubber blocks picked by the robot 200). This step may include the step of training the supply installation 22 to recognize non-equivalences between the compared values. Each training step may include a classification generated by self-learning means. This classification may include, without limitation, the parameters of the selected batches, the durations of the clamping and unclamping processes, and the expected values at the end of a current campaign (e.g., the weight of rubber blocks posed in empty bins $B_V$ to achieve a desired batch).

A monitoring system could be implemented at site 10, and at least a portion of this system may be provided by a wearable device such as a mobile network device (e.g., a cell phone, a laptop computer, a wearable network-connected device(s) (including "augmented reality" and/or "virtual reality" devices), wearable network-connected clothing, and/or any combinations and/or equivalents)).

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. A supply installation for a site for producing rubber products from rubber blocks of rubber mixtures of predetermined weight and volume, the supply installation comprising:
   an input station where the supply installation performs a process of entry of empty bins for receiving, during a picking process, rubber blocks identified to satisfy a rubber product production campaign;
   a discharge station where the supply installation performs a process of discharging full bins containing the picked rubber blocks;
   a supply means that manages the transport of the empty bins and the full bins to the supply installation; and
   a picking station that performs a process of picking the rubber blocks grouped in a container according to the status of the current rubber product production campaign,
   wherein the picking station comprises:
      at least one automated cell with at least one container assigned to the or each cell; and
      at least one robot that performs a picking process of the rubber blocks grouped in the containers, with the robot operatively disposed relative to the at least one automated cell and relative to the supply means, and
   wherein the at least one automated cell comprises:
      a frame that allows the at least one automated cell to be secured;
      an automatic centering system comprising a guiding means that allows precise positioning of a container deposited in a loading space of the at least one automated cell;
      a clamping system comprising a holding means that maintains the positioning of the container deposited in the loading space of the at least one automated cell; and
      a locking system comprising a locking means that ensures the maintenance of the positioning of the container deposited in the loading space of the at least one automated cell.

2. The supply installation of claim 1, wherein the guiding means of the at least one automated cell comprises a pair of guides aligned at the cell entrance,
   the holding means of the at least one automated cell comprises a tiltable holding frame with a pivoting chassis mounted on the frame so that the chassis moves between a standby position, where the chassis remains tilted to allow loading and positioning of the container in a loading space of the at least one automated cell, and a clamping position, where the chassis descends, and
   the locking means of the at least one automated cell includes a barrier mounted on the frame such that the barrier moves between an unlocked position, where the barrier remains tilted to allow loading and positioning of the container in the loading space, and a locked position, where the barrier moves up to block and abut the supply container in a known plane.

3. The supply installation of claim 2, wherein the chassis of the at least one automated cell comprises at least one of the following:
   a fastening means that allows the chassis to be moved between the standby position and the clamping position;
   a clamping member for forming the tiltable holding frame; and
   one or more flaps, each flap being pivotally movable up and down.

4. The supply installation of claim 1, wherein the at least one robot comprises:
   a gripping device supported by an elongated arm pivotable and extending from the elongated arm to a free end; and
   a gripper disposed at the free end of the gripping device, the gripper comprising a screw or screws installed in a functional platform of the gripper,
   wherein the at least one robot is set in motion so that the gripper can perform gripping of a target rubber block arranged in a container during a picking process performed by the at least one robot.

5. The supply installation of claim 1, wherein the at least one robot includes one or more load cells having a function of weighing the one or more rubber blocks picked up by the gripper during a picking process.

6. A flow control process for generating substantially automated flow control in a site for producing rubber products from rubber blocks of rubber mixtures of predetermined weight and volume, the process comprising the following steps:
   a step of recovering containers containing rubber blocks identified to satisfy a campaign for the production of the rubber products;
   a step of transporting the recovered containers to a supply installation of the site, during which each recovered container is identified with an associated nature of rubber mixture, the supply installation comprising:
      an input station where the supply installation performs a process of entry of empty bins for receiving, during a picking process, rubber blocks identified to satisfy a rubber product production campaign;
      a discharge station where the supply installation performs a process of discharging full bins containing the picked rubber blocks;
      a supply means that manages the transport of the empty bins and the full bins to the supply installation; and
      a picking station that performs a process of picking the rubber blocks grouped in a container according to the status of the current rubber product production campaign;
   a step of clamping during which the picking station performs a clamping process; and
   a step of picking during which the picking station performs a process of picking the rubber blocks gathered in the container for posing in a target location.

7. The flow control process of claim 6, further comprising the following steps:
   a step of introducing empty bins at the supply installation, during which the empty bins are introduced at the input station according to the number of bins to be filled during a picking process performed by the picking station; and a step of removing full bins from the supply installation, during which the full bins are discharged from the discharge station according to the rate of the current campaign.

8. The flow control process of claim 6, wherein the clamping process is performed by at least one automated cell of the picking station, and the picking process is performed by at least one robot of the picking station.

9. The flow control process of claim 8, wherein the clamping process comprises the following steps:

a step of positioning a container in the at least one automated cell;

a step of locking during which the container is clamped in the at least one automated cell; and a step of clamping during which the container is held in its position in the at least one automated cell.

10. The flow control process of claim 9, wherein the picking process comprises the following steps:

a step of determining one or more parameters of a target rubber block in the rubber blocks grouped in the clamped container;

a step of approach of a robot toward the target rubber block identified for picking from the container clamped during the clamping process;

a step of retaining the target rubber block;

a step of extracting the target rubber block from the clamped container; and a step of posing the picked rubber block in a target location comprising at least one empty bin waiting on the supply means.

11. The flow control process of claim 8, wherein the at least one robot repeats one or more steps of the picking process in a predetermined order to construct the bins full of rubber blocks that satisfy the current rubber product production campaign.

* * * * *